(12) United States Patent
Matsuda et al.

(10) Patent No.: US 6,275,218 B1
(45) Date of Patent: Aug. 14, 2001

(54) INFORMATION PROCESSING DEVICE, CONTROL METHOD FOR THE SAME DEVICE AND CONTROL PROGRAM RECORDING MEDIUM FOR THE SAME DEVICE

(75) Inventors: Eichika Matsuda, Yamatotakada; Kouichi Harada, Kitakatsuragi-gun, both of (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/357,760

(22) Filed: Jul. 21, 1999

(30) Foreign Application Priority Data

Aug. 18, 1998 (JP) .................................................. 10-231315

(51) Int. Cl.⁷ ..................................................... G09G 5/00
(52) U.S. Cl. .......................... 345/172; 345/168; 345/146; 345/334; 345/425
(58) Field of Search ..................................... 345/168, 146, 345/172, 214, 425, 334, 342

(56) References Cited

U.S. PATENT DOCUMENTS

| | | | |
|---|---|---|---|
| 5,602,566 | * 2/1997 | Motosyuku et al. | 345/123 |
| 5,767,845 | * 6/1998 | Oashi et al. | 345/302 |
| 6,133,914 | * 10/2000 | Rogers et al. | 345/334 |

FOREIGN PATENT DOCUMENTS 4-139511   5/1992 (JP) .
8-137846   5/1996 (JP) .

* cited by examiner

*Primary Examiner*—Richard Hjerpe
*Assistant Examiner*—Mackly Monestime
(74) *Attorney, Agent, or Firm*—Nixon & Vanderhye, P.C.

(57) ABSTRACT

An information processing device that can use two different functions for returning an initial screen and a preceding state by a simple method, a control method of the same device and a recording medium for recording a control program for the same device are provided. An information processing device having an initial screen including an initial image presentable after turning on a power supply and having a returning means for returning from a current screen state to a preceding screen state or returning from any screen state to the initial screen, wherein it is provided with a key-operation counting portion for counting the number-of-operations of a specific key, a reference storage portion for storing the reference number-of-operations of the specific key, a comparison portion for comparing the number of operations counted by the key-operation counting portion with the reference value stored in the reference storage portion, and a control means for driving the returning means according to the comparison result in such a way that the returning means executes its function for returning to the initial screen state when the counted number matches the reference number and the returning means executes its function for returning to a preceding screen state when the counted number does not match the reference number.

5 Claims, 11 Drawing Sheets

SCHEDULE

| CALENDER | WEEK | DAY |
|---|---|---|

JULY 19 - 25, 1998

THIS WEEK

DETAILS

NEW PREPARATION    CORRECTION

| SUN | MON | TUE | WED | THU | FRI | SAT |
|---|---|---|---|---|---|---|
| 28 | 29 | 30 | 1 | 2 | 3 | 4 |
| 5 | 6 | 7 | 8 | 9 | 10 | 11 |
| 12 | 13 | 14 | 15 | 16 | 17 | 18 |
| 19 | 20 | 21 | 22 | 23 | 24 | 25 |
| 26 | 27 | 28 | 29 | 30 | 31 | 1 |
| 2 | 3 | 4 | 5 | 6 | 7 | |

| 19 SUN | | | | | |
|---|---|---|---|---|---|
| 20 MON | DAY OF SEA | | | | |
| 21 TUE | | | | | |
| 22 WED | DAY OF CLOGS | | | | |
| 23 THU | DAY OF LETTERS | | | | |
| 24 FRI | | | | | |
| 25 SAT | DAY OF THE HIGHEST TEMPERATURE RECORD | | | | |

FIG.6

SCHEDULE

CALENDER | WEEK | DAY

[NEW PREPARATION] [CORRECTION]

COMMEMORATION DAY | JULY 25

CONTENT | DAY OF THE HIGHEST TEMPERATURE RECORD, DAY OF SUMMER ICE

■ DAY OF THE HIGHEST TEMPERATURE
THIS DAY OF 1933. THE METEOROLOGICAL STATION IN YAMAGATA PREFECTURE MEASURED ATMOSPHERIC TEMPERATURE OF 40.9 °C. THAT IS THE HIGHEST RECORD OF ATMOSPHERIC TEMPERATURE IN JAPAN.
THIS WAS BROUGHT BY "FOEHN PHENOMENON" -WARM DRY WIND FLOWING INTO BASINS AMONG MOUNTAINS.

INFORMATION PROCESSING DEVICE, CONTROL METHOD FOR THE SAME DEVICE AND CONTROL PROGRAM RECORDING MEDIUM FOR THE SAME DEVICE

BACKGROUND OF THE INVENTION

The present invention relates to an information processing device having an initial screen image, its control method and a recording medium holding a record of control processing procedure and, more particularly, to an information processing device having both functions for returning a screen image to a preceding state and to an initial screen, a control method of the device and a recording medium holding the control program.

Many kinds of conventional information devices including portable information terminals have a predetermined initial image presentable just after turning on its power supply or driving a browser software for communication over the Internet. The presentation of such a fixed specified initial screen image is intended to give a user sense of relief and convenience for operation.

Known techniques to realize the above are as follows:

(1) To give a user feeling of relief, many browser softwares provide a function for returning from any current screen image to a specified initial screen image by operating a functional key "HOME" any time irrespective of current conditions. On the other hand, it has been also realized that a user can return from any current state to a preceding state by using a specially designated "RETURN" key in case of having made an error in key operation or re-confirming the preceding state.

(2) In distinction from the above method using two different keys for driving respective functions, there also exists an alternative method for driving two respective functions by using one designated key only and together with, e.g., a "SHIFT" key.

Furthermore, techniques for switching-over two functions "return to an initial screen" and "return to a preceding state" are disclosed in (3) Japanese Laid-Open Patent Publication No. 4-139511 and (4) Japanese Laid-Open Patent Publication No. 8-137846.

(3) The technique disclosed in Japanese Laid-Open Patent Publication No. 4-139511 is such that an information processing device provided with a timer means and a presetting means measures an elapse of time for which no key-operation was made and, when a time counted by the timer means meets with a time duration preset by the time-presetting means, automatically makes a backup copy of the current content and returns to an initial screen.

(4) The technique disclosed in Japanese Laid-Open Patent Publication No. 8-137846 is such that an information processing device which is a word processor with a sentence-backup function and is provided with a passing-time measuring means and which measures an elapse of time for which no key-operation was made, discriminates whether the elapsed time reaches a preset time and, if so, it forcibly registers sentences edited up to that moment in a backup area, clears the current screen and returns to an initial screen.

However, the above-described arts involve the following problems:

The prior art (1) uses two different keys "HOME" and "RETURN" which enables a user to return to the initial screen or the preceding state anytime. However, the provision of two different keys is inconvenient in common for small-size information processing devices having a limited space for control elements. Each of the keys must have a reduced size and difficult to operate.

The prior art (2) must use two keys (one designated key and the SHIFT key) at a time for driving the second of two functions in principle. In a small information processing device, the operation of two small keys at a time is not easily done.

The prior art (3) is intended to a device that can set a time duration and, if no operation on a keyboard is made for the preset time, automatically makes a backup copy of a content of the current operation (i.e., a current processing content) and returns to the initial screen. It discloses merely the above and does not suggest means and method for returning to a preceding state.

The prior art (4) is directed to a device that, if no operation was made on a keyboard, automatically makes a backup copy of a current content (sentences being currently edited) and returns to the initial screen. It discloses merely the above and does not suggest means and method for returning to a preceding state.

SUMMARY OF THE INVENTION

The present invention is directed to an information processing device of small-type or portable-size type having a small operation panel and a small screen, which enable users to use two different functions, one for returning to an initial screen and the other for returning to a preceding state, by a simple operation in such a manner that these two different functions are selected and conducted according to the respective specified numbers of operations successively made on a specific key (button) or the respective specified operating time-lengths of the same key (button). The present invention is also directed to a control method of the information processing device and a recording medium for storing the control program.

Accordingly, an object of the present invention is to provide an information processing device having an initial screen presentable just after switching on power supply and as necessary thereafter and having preceding-state and initial-state returning means for executing a procedure for returning to a preceding state after transition of a screen state from one to another and a procedure for returning from any screen state to the initial screen, wherein it is provided with a counting means for counting the number of successive operations (pushes) made on a specific key, a reference storage means for storing the reference number of successive operations (pushes) necessarily made on the specific key to start the initial-state returning function, a comparison means for comparing the number of operations counted by the counting means with the reference value stored in the reference storage means and a control means for driving the returning means according to the comparison result in such a way that the initial-state returning means executes its function for returning to the initial screen when the counted number matches the reference number and the preceding-state returning means executes its function for returning to a preceding state when the counted number does not match the reference number.

Another object of the present invention is to provide an information processing device having an initial screen presentable just after switching on power supply and as necessary thereafter and having preceding-state and initial-state returning means for executing a procedure for returning from a current state to a preceding state after screen-state transition and a procedure for returning from any screen state to the initial screen, wherein it is provided with a time-length measuring means for measuring a time-length of operation made on a specific key, a reference storage means for storing the reference time-length of operation to be necessarily made on the specific key to start the initial-state returning function, a comparison means for comparing the key-operation time-length measured by the time-length measuring means with the reference value stored in the reference storage means, and a control means for driving the returning means according to the comparison result in such a way that the initial-state returning means executes its function for returning to the initial screen when the measured time-length of the specific-key-operation is equal to or more than the reference value and the preceding-state returning means executes its function for returning to a preceding state when the measured time-length is less than the reference value.

Still another object of the present invention is to provide a control method of an information processing device having an initial screen presentable just after switching on power supply and as necessary thereafter, comprising mainly of a preceding-state returning step of returning to preceding state after screen-state transition and an initial-state returning step of returning from any screen to the initial screen, which further comprises, in the execution order, a counting step of counting the number of successive operations made on a specific key, a storing step of storing the reference number of successive operations to be necessarily made on the specific key to start the initial-state returning function, a comparing step of comparing the counted number of operations made on the specific key with the stored reference value, a control step of driving either of the returning functions according to the comparison result in such a way that the initial-state returning step is executed when the counted number is equal to the reference number and a preceding-state returning step is driven when the counted number is not equal to the reference number.

A further object of the present invention is to provide a control method of an information processing device having an initial screen presentable just after switching on power supply and as necessary thereafter, comprising mainly of a preceding-state returning step of returning to preceding state after screen-state transition from one to another and an initial-state returning step of returning from any screen to the initial screen, which further comprises, in the execution order, a step of measuring a time-length of operation made on a specific key, a storing step of storing a reference time-length of operation to be necessarily made on the specific key to start the initial-state returning step, a comparing step of comparing the measured key-operation time-length with the stored reference value, and a control step of driving either of the returning steps according to the comparison result in such a way that the initial-state returning step is executed when the measured time-length matches the reference value and the preceding-state returning step is executed when the measured time-length is does not match the reference value.

A still further object of the present invention is to provide a recording medium storing a program for use in a computer having an initial screen presentable just after switching on power supply and as necessary thereafter, having a preceding-state returning function for returning from a current state to a preceding state and an initial-state returning function for returning from any screen to the initial screen, which program causes the computer to execute a counting function for counting the number of operations made on a specific key, a storing function for storing the reference number of operations to be made on the specific key for starting the initial-state returning function and a comparison function for comparing the counted number of successive operations of the key with the stored reference value, and a control function for driving either of the returning functions according to the comparison result in such a way that the initial-state returning functions is executed when the counted number matches the reference number and the preceding-state returning function is executed when the counted number does not match the reference number.

PREFERRED EMBODIMENT OF THE INVENTION

An information processing device, a control method of the same device and a recording medium storing therein a control program for the same device, which are preferred embodiments of the present invention, will be described below with reference to accompanying drawings.

First Embodiment

This embodiment is featured in that a preceding state-returning function or an initial-screen(initial-state) returning function is selectably executed according to the number of successive operations made on a specific key (button). In the other words, both functions can be realized by using only a single key (button).

Figure 1:
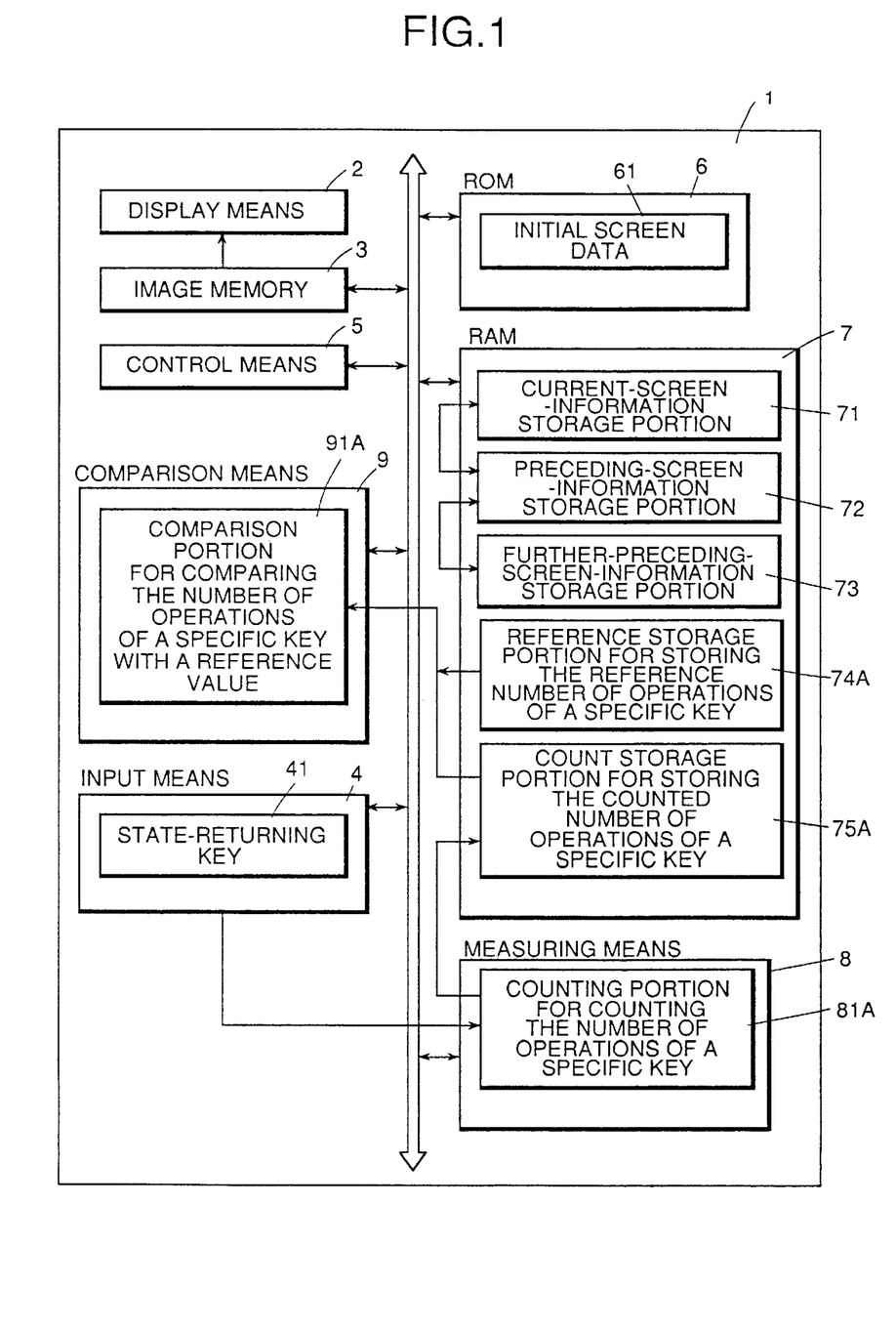
FIG. 1 is a functional block diagram of an information processing device that is a first embodiment of the present invention.

FIG. 1 is a functional block diagram of an information processing device that is a first embodiment of the present invention.

As shown in FIG. 1, the information processing device 1 is composed of a display means 2, an image memory 3 for storing an information content to be displayed by the display means 2, an input means 4 for inputting data and control commands, a control means 5 for controlling a whole system, a read-only memory (ROM) 6 storing a system control program (to be described later), a random access memory (RAM) 7 having a variety of work areas, a measuring means 8 including a specified-key-operation counting portion 81A for counting the number of successive operations made on a specific key and a comparison means 9 including a key-operation comparison portion 91A is for comparing a value counted by the counting portion 81A with a reference number of operations.

The display means 2 is constructed by a display device (e.g., an LCD and a CRT) which can display character and image information on its screen.

The image memory 3 is composed of a video RAM having a function for drawing image data by using the display means.

The input means 4 is composed of a keyboard, tablet and mouse, which are capable of inputting information and operating the processing device. The means 4 includes a state-returning key 41 to be described later.

The control means 5 is composed of a CPU (Central Processing Unit) or MPU (Micro Processing Unit), which is capable of controlling a whole system of the information processing device 1.

The ROM 6 stores therein a system control program (to be described later), which is used for controlling a whole system of the information processing device 1, and also stores image-drawing data for screen images including an initial screen image. Namely, this memory (ROM 6) is a recording medium storing therein the control program and data.

The RAM 7 has portions for storing various kinds of image information, i.e., a current-screen-information storage portion 71 for storing image information being currently displayed on the display means 2, a preceding-screen-information storage portion 72 for storing a preceding screen image, i.e., an image information displayed at the last time by the display means 2, a further-preceding-screen-information storage portion 73 for storing further earlier screen information, i.e., screen information displayed by the display means just before the preceding one, a reference operation-count storage portion 74A for storing a reference value of the number of operations of the specific key, a counted-number-of-operations storage portion 75A for storing a counted number-of-successive-touches of the specific key and a variety of work areas necessary for operation of the information processing device 1.

The measuring means 8 has various-measurement processing portions including a specific-key-operation counting portion 81A that counts the number of successive operations (touches) made on the specific key. When a user successively and repeatedly presses a RETURN key, the counting portion 81A successively counts these pressing operations. However, the count is reset if the another key is pressed in midway. The counted value is stored in the count storage portion 75A of the RAM 7.

The comparison means 9 has various comparison-processing portions including a specific-key-operation number comparison portion 91A that compares the reference value (i.e., the reference number of operations) stored in the portion 74A of the RAM 7 with the counted value (i.e., the counted number of operations) stored in the portion 75A of the RAM 7. The comparison result causes the specific key to function as an initial-screen returning key when the counted number of operations was not more than the reference value or as a preceding-state returning key when the counted number was less than the reference value.

A method for switching-over the above-described two functions (i.e., the function for returning to the initial screen and the function for returning to a preceding screen), which is realized in the present embodiment, will be described below with reference to the above-defined components of the device.

Figures 2, 2A:
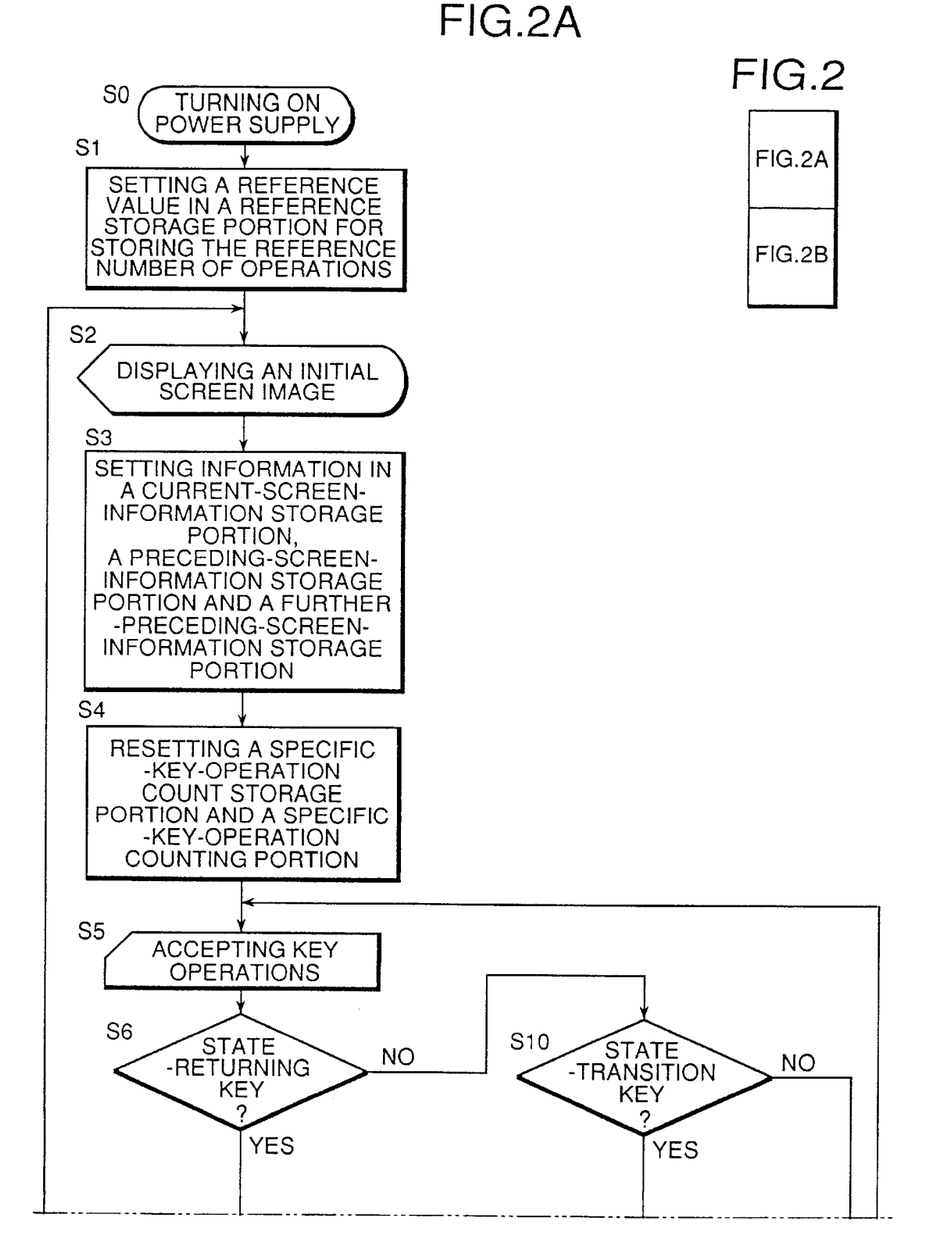
FIG. 2 shows the correct alignment of the drawing sheets for FIGS. 2A and 2B.
FIGS. 2A and 2B are flow charts depicting how to control the information processing device according to the first embodiment of the present invention.
Figure 2B:
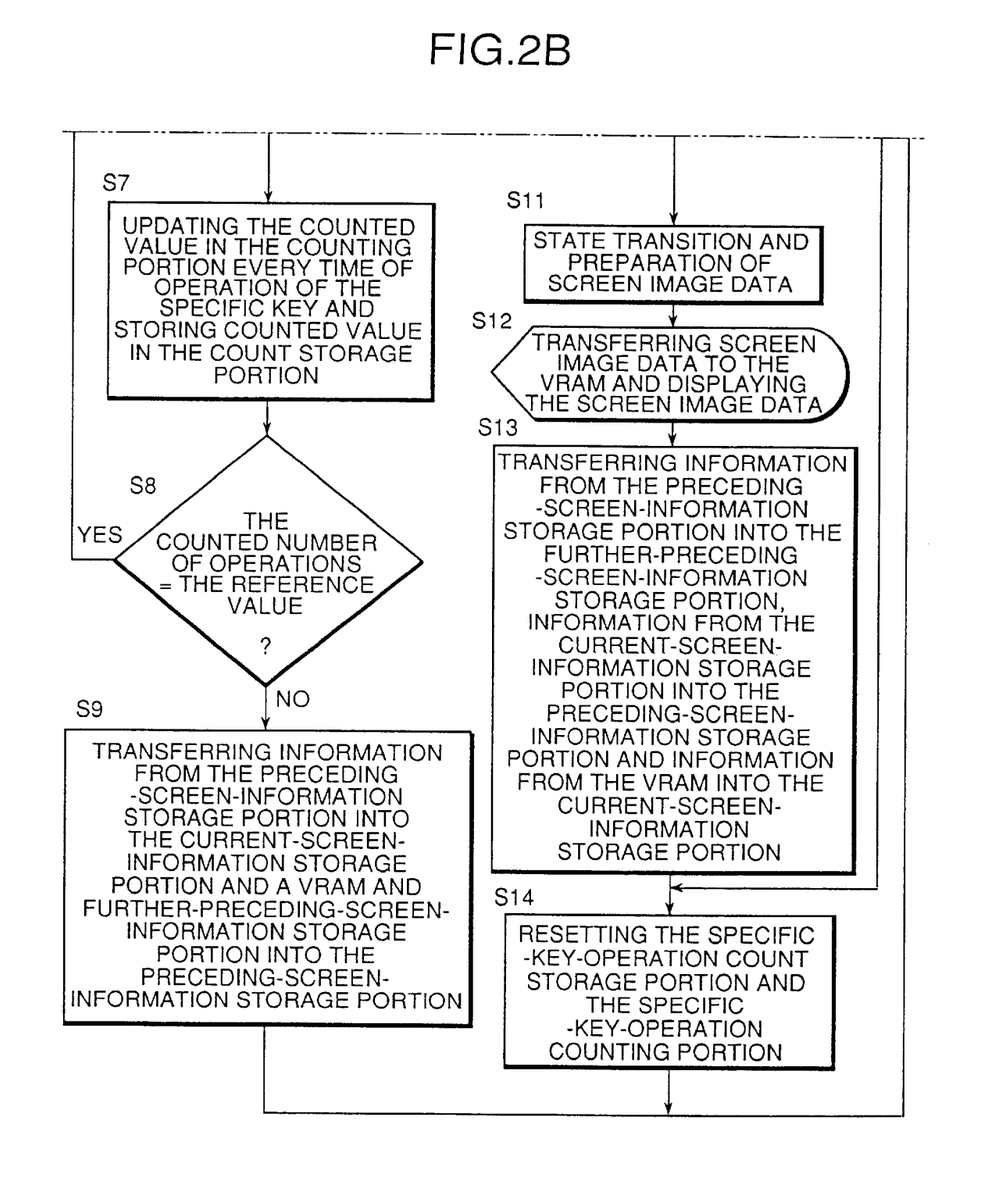

FIG. 2 is a flow chart depicting a procedure for changing over two returning functions from the initial-screen returning function to the preceding-state returning function and vice versa.

Referring to FIG. 2, a processing sequence is described first as follows:

At Step S0, the information processing device 1 is powered by turning on a power switch or power key.

At Step S1, the system of the device 1 is initialized and a default value is set in the reference storage portion 74A of the RAM 7. The value stored in the reference storage portion 74A may be fixed as a default value or may be preset by the user. This value means that current screen image can be returned to the initial screen by successively operating, e.g., a state-returning key 41 by the reference number of times.

At Step S2, an initial screen image is presented on completion of initialization of the system. In the shown case, the initial screen image is formed from initial-screen data 61 transferred from the ROM 6 to image memory 3, e.g., the video RAM and displayed.

At Step S3, the initial screen data is stored in a current-screen-information storage portion 71, a preceding-screen-information storage portion 72 and a further-preceding-screen-information storage portion 73 of the RAM 7 respectively. Namely, the initial setting value is set in working areas for a variety of screen information.

At Step S4, a value stored in a specific-key-operation-count storage portion 75A of the RAM 7 is reset to zero and a value set in a specific-key-operation counting portion 81A of the measuring means 8 is also reset to zero before receiving key-operations.

At Step S5, the information processing device 1 in this state accepts signals inputted by user through a keyboard and executes the processing designated by the user's keyboard operation. This state is called hereinafter a basic state. In this basic state, the user may operate keys which are classified mainly into three kinds: (1) a state-returning key, (2) a state-transition key and (3) other keys.

The state-returning key (1) is an essential key of this embodiment of the present invention, which is operated to change a screen image from a current state to a preceding state or an initial screen.

The state-transition key is used to transfer a current state, e.g., "looking" or "writing" to another state, as necessary, for example, to display data, input data or change a display form.

The other keys (3) are system control keys such as OFF and STOP keys for stopping current working such as data inputting and edition and character keys for inputting ANK characters, numerals and data.

The operation of the above-described three kinds of keys in the basic state is as follows:

At Step S6, an accepted key is checked whether it is a state-returning key or not. If so, the procedure advances to Step S7. If not, the procedure advances to Step S10.

At Step S7, the counting portion 81A counts the number of operations made on the specific key and stores the counted number in the specific-key-operation count storage portion 75A of the RAM 7.

At Step S8, the value stored in the count storage portion 75A of the RAM 7 is compared with the reference value stored in the reference storage portion 74A of the RAM 7. The procedure advances to Step S2 to present the initial screen image if the comparison result shows two values being equal to each other. Namely, the current screen irrespective of its state can be changed to the initial screen image. If two values does not meet each other, the procedure advances to Step S9.

At Step S9, data in the preceding-screen-information storage portion 72 of the RAM 7 is transferred to the current screen information storage portion 71 and the image memory (video RAM) 3, the data in further-preceding-screen-information storage portion 73 of the RAM 7 is transferred to the preceding screen-information storage portion 72 of the RAM 7. Then, the procedure advances to Step S5 for waiting for next input from the keyboard. Namely, the screen can be now returned to the preceding state stored in the preceding-screen-information storage portion 72.

At Step S10, an accepted key is checked whether it is a state-transition key or not. If so, the procedure advances to Step S11. If not, the procedure advances to Step S14 after conducting the processing (not shown) of a command input from the key.

At Step S11, the state is transited from the current state to the state designated by the pressed state-transition key and screen image data to be displayed is prepared.

At Step S12, the screen data prepared at Step S11 is transferred to the image memory (video RAM) 3 to display the screen image designated by the pressed key.

At Step S13, data in the preceding-screen-information storage portion 72 of the RAM 7 is transferred to the further-preceding-screen-information storage portion 73, data in the current-screen-information storage portion 71 is transferred to the preceding-screen-information storage portion 72 and data (currently displayed data) in the image memory (video RAM) 3 is transferred to the current-screen-information storage portion 71 so as to make preparations for accepting the operation of the state-returning key 41.

At Step S14, there occurs such a transitional state that state has been changed according to the input from a state-transition key (2) but the state-returning key is not successively operated or another key (3) is operated not changing the current state and the state-returning key is not successively operated. Accordingly, the value in the specific-key-operation count storage portion 75A of the RAM 7 is reset to zero and the value in the specific-key-operation counting portion 81A of the measuring means 8 is also reset to zero.

The above-described processing sequence is carried out in the shown embodiment of the present invention.

The practical transition of a screen image will be described as follows:

FIGS. 3 to 7 are illustrative of transitional screen images when processing is made according to the sequence of FIG. 2.

Figure 3:
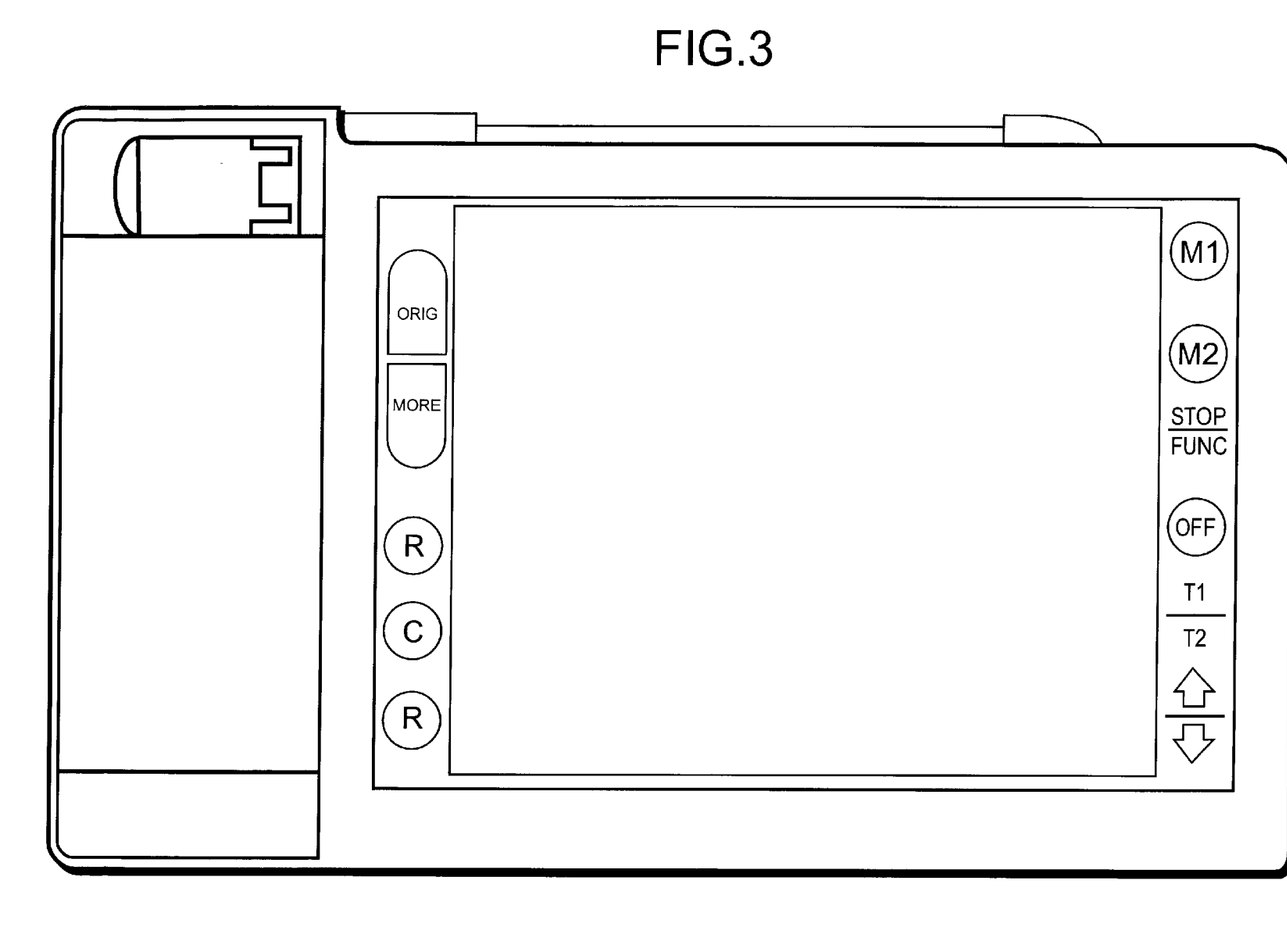
FIG. 3 shows a schematic diagram for explaining the transition of a screen image from one to another according to the first and second embodiments of the present invention.

FIG. 3 shows the information processing device in the state when its power supply circuit is not switched on. A power-supply switch or a power-supply key (not shown) is turned on in the shown state of the device. An initial screen shown in FIG. 4 appears on a display screen of the device according to the processing sequence of FIG. 2. It is assumed that the state-returning key is a RETURN ("R") key shown in FIG. 2 and a default value "2 (2 times)" is set in the reference-number-of-operations storage portion 74A of the RAM 7. As described before, the default value may be set as a fixed value or may be set by a user, for example, by selecting an input item provided in a menu on the inputting screen.

Figure 4:
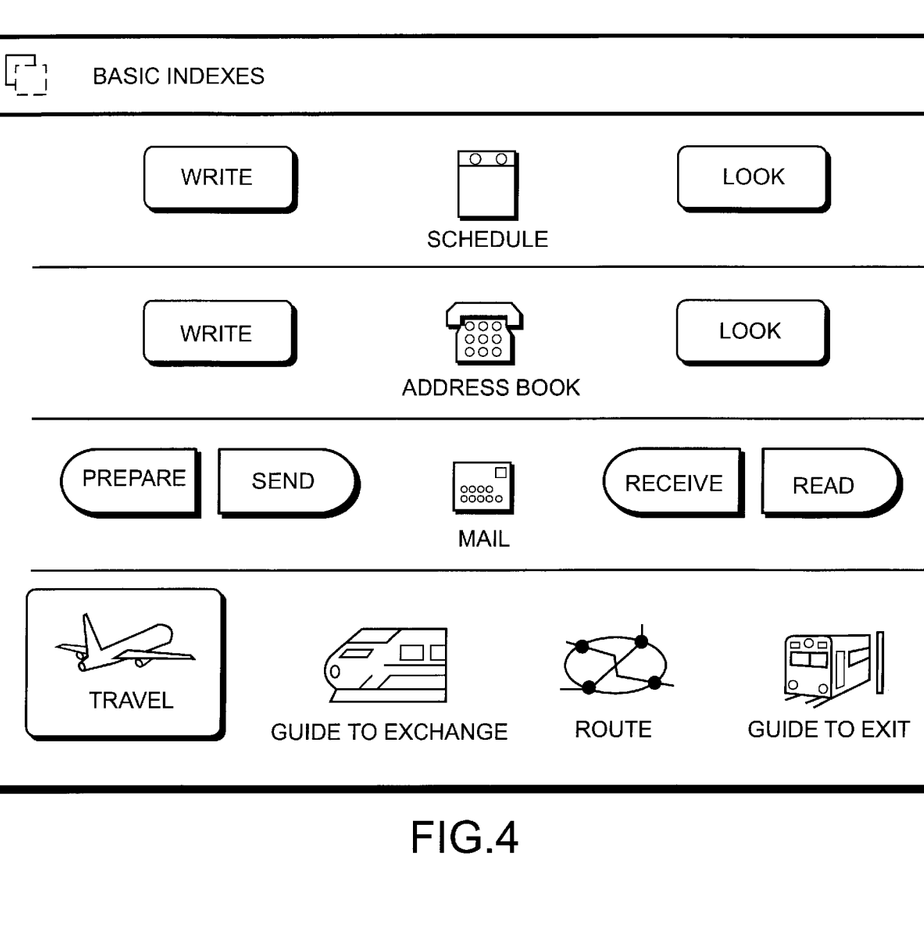
FIG. 4 shows a schematic diagram for explaining the transition of a screen image from one to another according to the first and second embodiments of the present invention.

On the initial screen of FIG. 4, the user operates a LOOK key to confirm a schedule data. A one-month calendar is displayed on the display screen as shown in FIG. 5.

Figure 5:
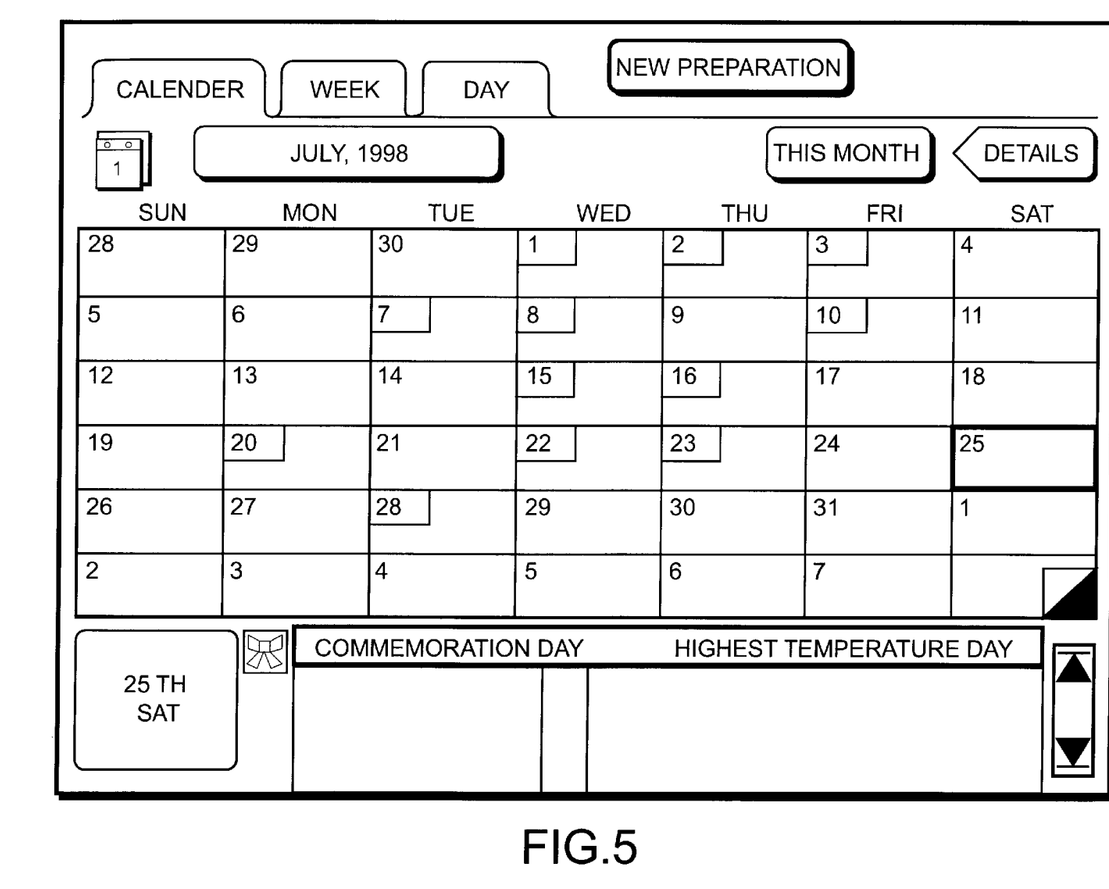
FIG. 5 shows a schematic diagram for explaining the transition of a screen image from one to another according to the first and second embodiments of the present invention.
Figure 6:
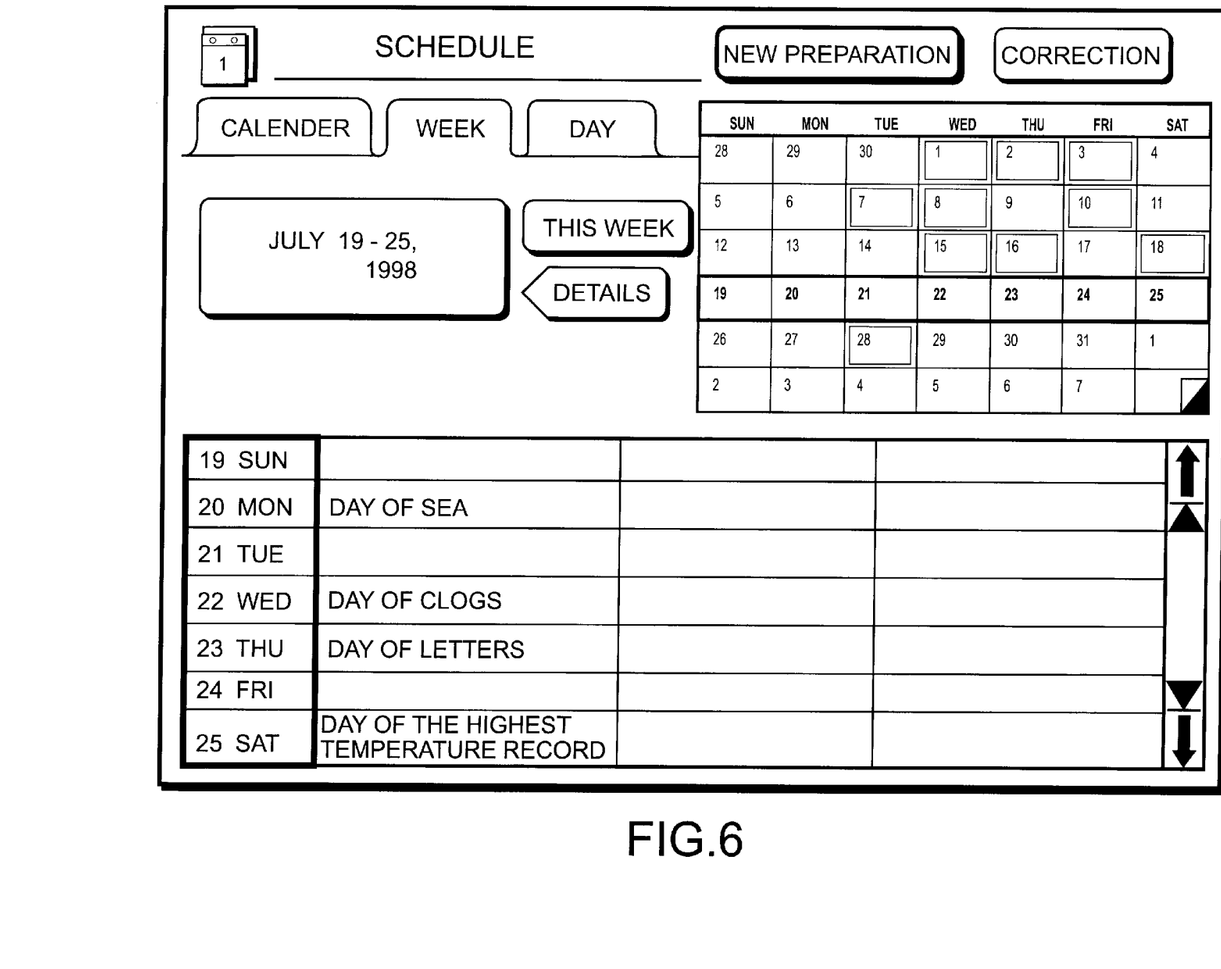
FIG. 6 shows a schematic diagram for explaining the transition of a screen image from one to another according to the first and second embodiments of the present invention.

In the "one-month calendar" screen state of FIG. 5, the user presses a WEEK key to confirm a one-week schedule that is thereby displayed on the display screen as shown in FIG. 6.

In the "week schedule" screen state of FIG. 6, the user touches a position "25th day" or "the day of the highest atmosphere temperature" on the screen of FIG. 6 or put a cursor at the position "25th day" and operates a DETAILS key to confirm details of the schedule of July 25. A detailed content of the schedule on 25th of July is displayed on the display screen as shown in FIG. 7.

Figure 7:
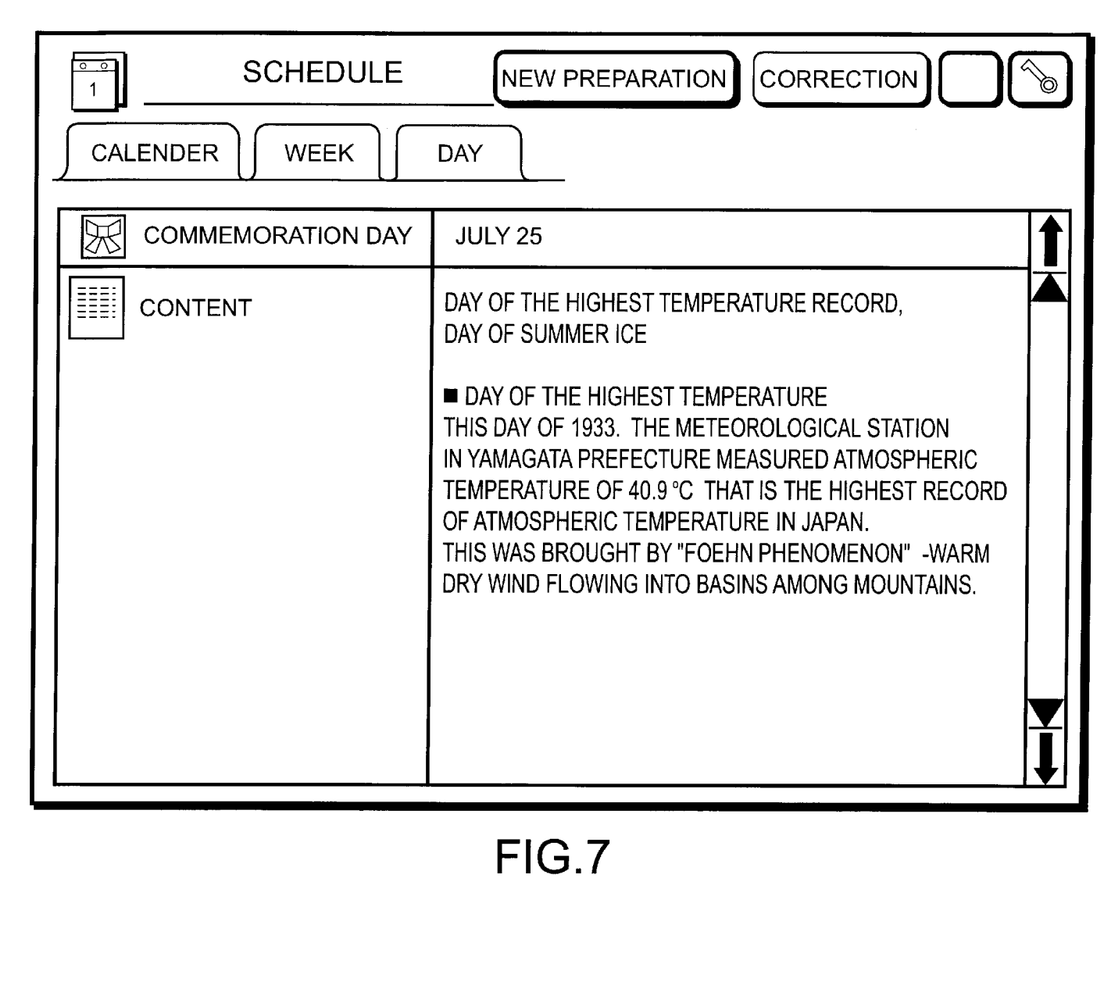
FIG. 7 a schematic diagram for explaining shows the transition of a screen image from one to another according to the first and second embodiments of the present invention.

FIG. 7 shows a screen containing the details of the schedule on 25th of July. In this state of the screen, the user operates the RETURN key shown in the FIG. 3, thereby the screen returns to the one-week schedule again. Namely, a single touch of RETURN key causes the screen to return the preceding screen state. (The screen returns to a preceding state (Step S8 of FIG. 2) because the RETURN key was pressed one time, not two times.)

Further in the screen "the one-week-schedule", the user operates the RETURN key two times in succession to return to the initial screen of FIG. 4. Namely, two successive touches of the RETURN key resumes the initial screen. (The screen returns to the initial state (Step S8 of FIG. 2) because the Return key was operated two times in succession.)

Thus, the screen can be turned to subscreen by operating the "state-transition" keys (LOOK, WEEK keys, etc.) and it can be then returned to a preceding state or the initial screen by operating the RETURN key only depending upon the number of operations made on the same key.

The embodiment uses the RETURN key as the state-returning key but is not limited to this. Although the embodiment uses only one state-returning key, it may also use a combination of plural keys.

The above-described embodiment can use a specific key (e.g., the RETURN key (button) in this example) as two-functional key that functions as a state-returning key with a single touch and functions as an initial-screen returning key with two successive touches. Namely, two different functions "Return to preceding state" and "Return to the initial screen" can be realized by using only one specific key. Furthermore, this embodiment enables the user to change the reference number of specific-key-operations to any desired value to effectively use the above two-different functions of the key. Thus, the present invention can provide the information processing device and the control method, which can be easily and effectively used by every user.

Second Embodiment

This embodiment of the present invention is featured by the control with a specific key (button) having two functions, one being a function for returning to a preceding state and the other being a function for returning to an initial screen, both functions can be realized by control of time-length of operation of the specific key (button).

In the following description, components of the device, which are similar to those of the first embodiment, are given the same numerals and will not be described further.

Figure 8:
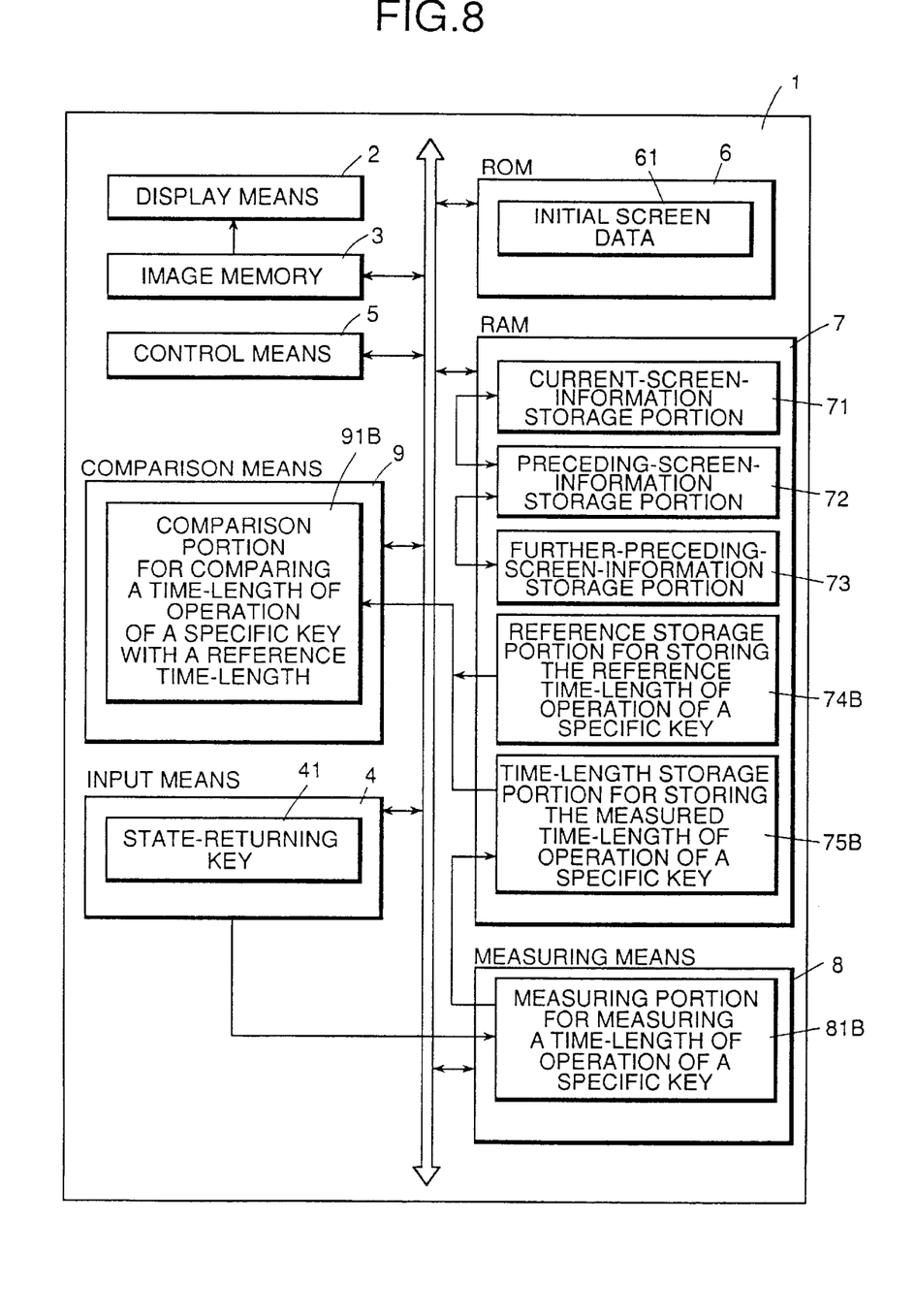
FIG. 8 is a functional block diagram of an information processing device that is a second embodiment of the present invention.

FIG. 8 is a functional block diagram of an information processing device that is a second embodiment of the present invention.

As shown in FIG. 8, the information processing device 1 is composed of a display means 2, an image memory 3 for storing an information content to be displayed by the display means 2, an input means 4 for inputting data and control commands, a control means 5 for controlling a whole system of the device, a read-only memory (ROM) 6 storing a system control program (to be described later), a random access memory (RAM) 7 having a variety of work areas, a measuring means 8 including a specified-key-operation time-length measuring portion 81B for measuring a time-length of operation made on a specific key and a comparison means 9 including a specific-key-operation-time-length comparison portion 91B for comparing a time-length value measured by the measuring portion 81B with a reference time-length value.

This embodiment differs from the first embodiment by the following:

The RAM 7 has a plurality of storage portions for storing a variety of image information. Namely, the RAM 7 has a current-screen-information storage portion 71 storing image information that is currently displayed by the display means 2, a preceding-screen-information storage portion 72 storing preceding image information that was displayed at the last time by the display means 2, a further-preceding-screen-information storage portion 73 storing further earlier screen information that was displayed by the display means 2 just before the preceding one, a reference operation-time-length storage portion 74B for storing a reference value of operation time-length of the specific key, a measured operation-time-length storage portion 75B for storing a result of measurement of time-length of pressing the specific key and a variety of work areas necessary for operation of the information processing device 1.

The measuring means 8 has a plurality of measurement processing portions including a specific-key-operation-time-length measuring portion 81B that measures a time-length for which the specific key is pressed. The time-length measuring portion 81B is constructed of a counter whose count-value increases while the a signal input from the key is maintained (i.e., the key is pressed). The input signal disappeared (the key is released) and the counter stops counting. Since the counter was reset before accepting a signal input from the specific key, the operation time-length of the key can be measured as a value counted by the counter. Alternatively, the measuring portion 81B may be constructed of a timer that can define the beginning time of a signal input from the key and the ending time of the same input signal and determines a difference between two time values, which corresponds to the time-length of operation of the key. The difference value may be accumulated if the needs be. The measurement result is stored in the measured operation-time-length storage portion 75B of the RAM 7.

The comparison means 9 has various comparison-processing portions including a specific-key-operation time-length comparison portion 91B that compares the reference value (i.e., the reference time-length of operations) stored in the reference operation-time-length storage portion 74B of the RAM 7 with the measured value (i.e., the measured time-length) stored in the measured-operation-time-length storage portion 75B of the RAM 7. The comparison result causes the specific key to function as an initial-screen returning key when the measured time-length value was equal to or more than the reference value or as a preceding-state returning key when the measured value was less than the reference value.

A method for switching-over the above-described two functions (i.e., the function for returning to the initial screen and the function for returning to a preceding screen), which is realized in the present embodiment, will be described below with reference to the above-described components of the device.

Figures 9, 9A:
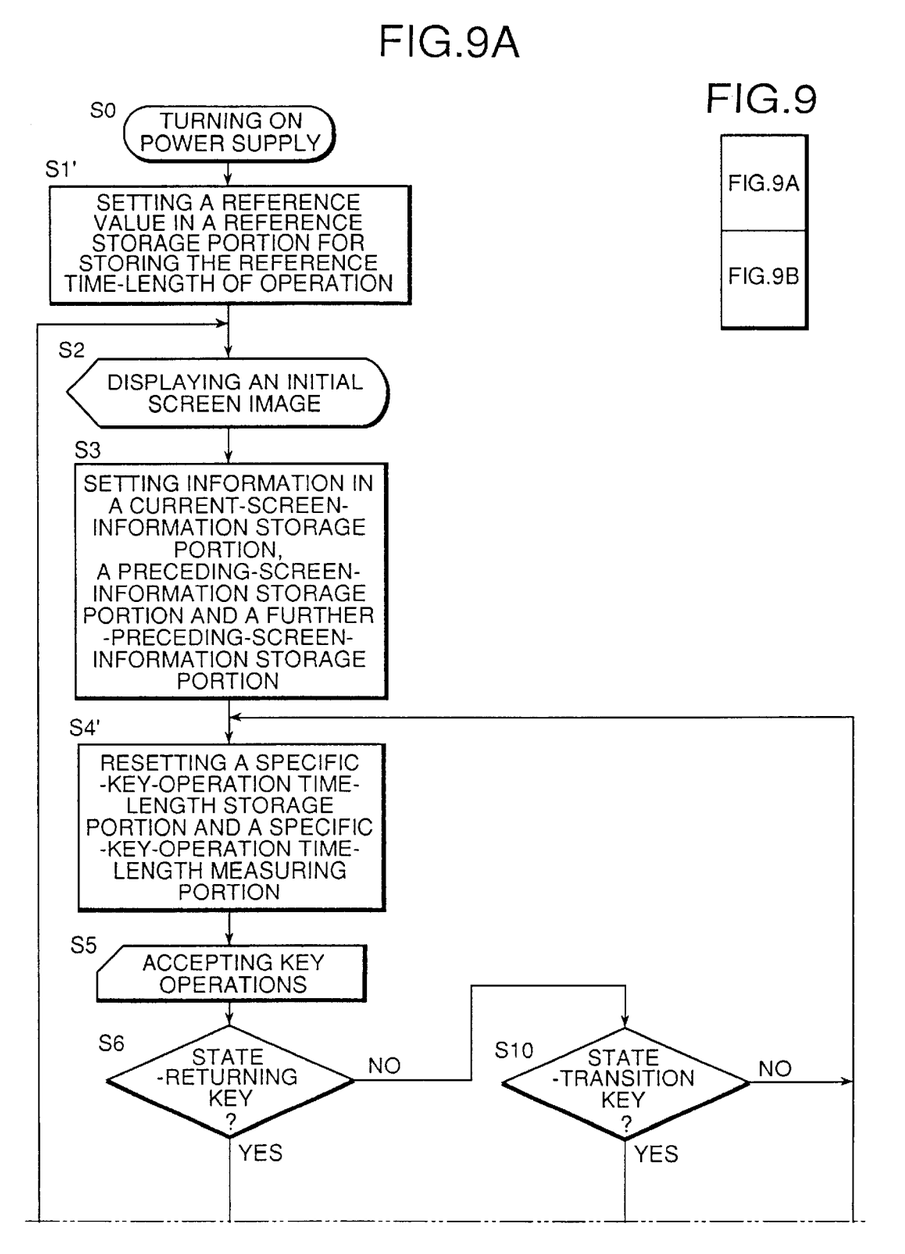
FIG. 9 shows the correct alignment of the drawing sheets for FIGS. 9A and 9B.
FIGS. 9A and 9B are flow charts depicting how to control the information processing device according to the second embodiment of the present invention.
Figure 9B:
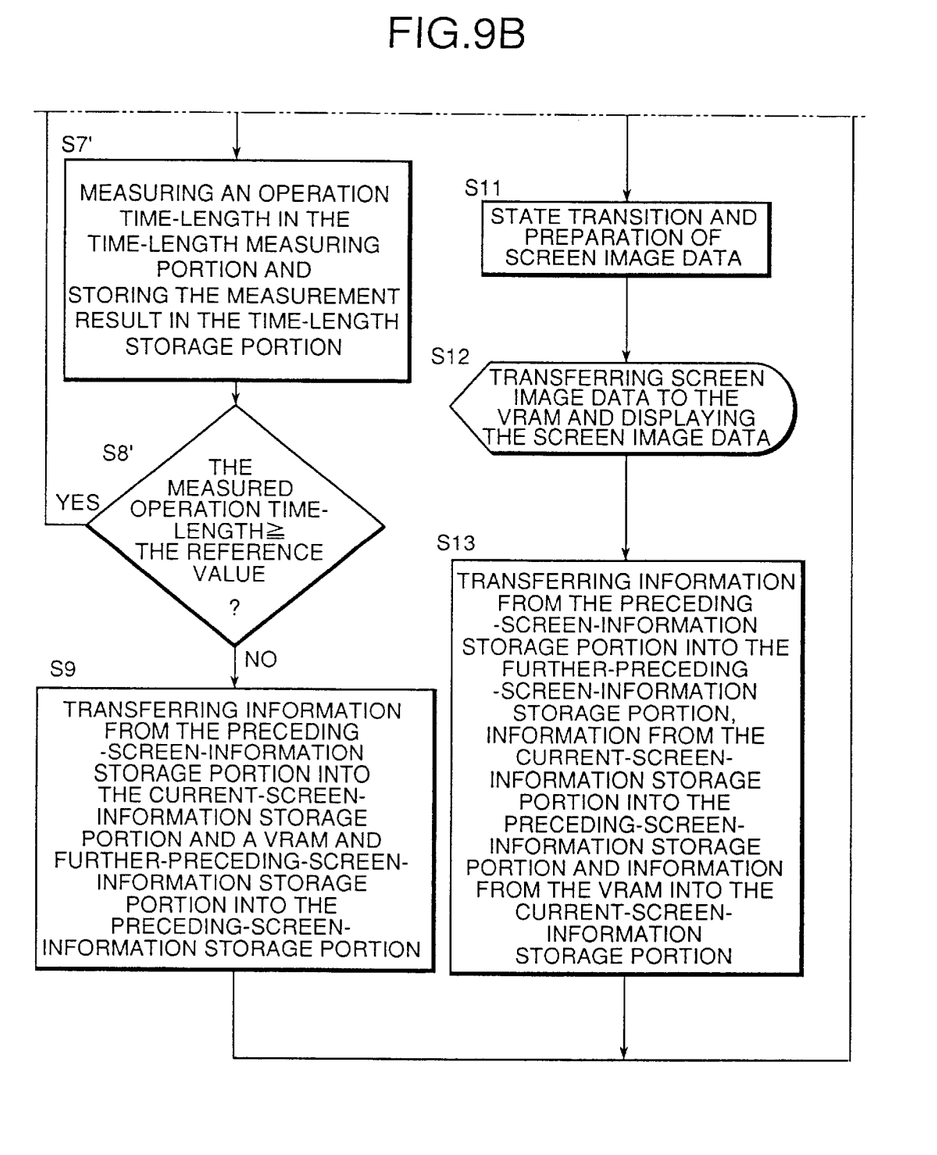

FIG. 9 is a flow chart depicting a procedure for changing over two returning functions from the initial-screen returning function to the preceding-state returning function or vice versa.

Referring to FIG. 9, a processing sequence of the device is described below as to its features different from those of the first embodiment.

At Step S1, the system of the device 1 is initialized and a default value is set in the reference operation-time-length storage portion 74B of the RAM 7. The value stored in the reference storage portion 74B may be fixed as a default value or may be preset by the user. This value means that current screen image can be returned to the initial screen by operating, e.g., a state-returning key 41 for the duration equal to or more than the reference time-length-value.

At Step S4', a value stored in a measured specific-key-operation time-length storage portion 75B of the RAM 7 is reset to zero and a value set in a specific-key-operation time-length measuring portion 81B of the measuring means 8 is also reset to zero before receiving key-operations.

At Step S6, an accepted key is checked whether it is a state-returning key or not. If so, the procedure advances to Step S7'. If not, the procedure advances to Step S10.

At Step S7', the measuring portion 81B measures the duration of time the specific key is operated and stores the measurement result in the measured operation time-length storage portion 75B of the RAM 7.

At Step S8', the value stored in the measured operation-time-length storage portion 75B of the RAM 7 is compared with the reference value stored in the reference operation-time-length storage portion 74B of the RAM 7. The procedure advances to Step S2 to display the initial screen image if the measured operation-time-length value is equal to or more than the reference value. Namely, the current screen irrespective of its state can be changed to the initial screen image. If the measured value is less than the reference value, the procedure advances to Step S9.

At Step S9, data in the preceding-screen-information storage portion 72 of the RAM 7 is transferred to the current screen information storage portion 71 and the image memory (video RAM) 3, the data in further-preceding-screen-information storage portion 73 of the RAM 7 is transferred to the preceding screen-information storage portion 72 of the RAM 7. Then, the procedure returns to Step S4'. Namely, the screen can be now returned to the preceding state whose information stored in the preceding-screen-information storage portion 72 since the state-returning key was operated for a time length shorter than the reference value.

At Step S10, an accepted key is checked whether it is a state-transition key or not. If so, the procedure advances to Step S11. If not, the procedure returns to Step S4' after conducting the processing (not shown) of the command input from the key. This state is such that the current screen state itself is not changed by the input from another key (3) and the state-returning key is not operated. Accordingly, it is possible to return from the current state to the preceding screen state whose information is stored in the preceding-screen-information storage portion 72.

At Step S13, data in the preceding-screen-information storage portion 72 of the RAM 7 is transferred to the further-preceding-screen-information storage portion 73, data in the current-screen-information storage portion 71 is transferred to the preceding-screen-information storage portion 72 and data (currently displayed data) in the image memory (video RAM) 3 is transferred to the current-screen-information storage portion 71 so as to make preparations for accepting the operation of the state-returning key 41. The procedure then returns to Step S4'. This state is such that the state has been changed according to the input from a state-transition key (2) but the state-returning key is not operated. Accordingly, it is possible to return from the current state to the preceding screen state whose information is stored in the preceding-screen-information storage portion 72.

The above-described processing sequence is carried out in the second embodiment of the present invention.

Referring to FIGS. 3 to 7, the practical transition of a screen image in the second embodiment will be also described below.

FIG. 3 shows the information processing device in the state that its power supply circuit is not switched on. A power-supply switch or a power-supply key (not shown) is turned on in the shown state of the device. An initial screen shown in FIG. 4 appears on a display screen of the device according to the processing sequence of FIG. 9. It is assumed that the state-returning key is a RETURN ("R") key shown in FIG. 3 and a default value "2 (2 seconds)" is set in the reference-operation-value storage portion 74B of the RAM 7.

As described before, the default value may be set as a fixed value or may be set by a user, for example, by selecting an input item provided in a menu on the inputting screen.

On the initial screen of FIG. 4, the user operates a LOOK key to confirm a schedule data. A one-month calendar is displayed on the display screen as shown in FIG. 5.

In the "one-month calendar" screen state of FIG. 5, the user presses a WEEK key to confirm a one-week schedule that is thereby displayed on the display screen as shown in FIG. 6.

In the "week schedule" screen state of FIG. 6, the user touches a position "25th" or "the day of the highest atmosphere temperature" on the screen of FIG. 6 or put a cursor at the position "25th day" and operates a DETAILS key to confirm details of the schedule of July 25. A detailed content of the schedule on 25th of July is displayed on the display screen as shown in FIG. 7.

FIG. 7 shows a screen containing the details of the schedule on 25th of July. In this state of the screen, the user operates the RETURN key shown in the FIG. 3, thereby the screen returns to the one-week schedule again. Namely, the current screen can be turned to a preceding state by pressing the RETURN key less than the reference time-length or to the initial screen by pressing the same key not less than the reference time-length.

Thus, the screen can be turned to subscreen by operating the "state-transition" keys (LOOK, WEEK keys, etc.) and it can be then returned to a preceding state or the initial screen by operating the RETURN key only depending upon the time-lengths.

The embodiment uses the RETURN key as the state-returning key but is not limited to this. Although the embodiment uses only one state-returning key, it may also use a combination of plural keys.

The above-described embodiment can use a specific key (e.g., the RETURN key (button) in this example) as a two-functional key that functions as a state-returning key by being pressed less than 2 seconds and functions as an initial-screen returning key by being pressed for 2 seconds or more. Namely, two different functions "Return to preceding state" and "Return to the initial screen" can be realized by using only one specific key. Furthermore, this embodiment enables the user to change the reference number of specific-key-operations to any desired value to more conveniently use the above two-different functions of the key. Thus, the present invention can provide the information processing device and the control method, which can be easily and effectively used by every user.

The above-described information processing devices, which are the first and second embodiments of the present invention, are realized on the basis of the control processing method including the processing procedures described before for respective embodiments. Accordingly, this control processing method is implemented as a control processing program recorded on a ROM 6 composing the information processing device 1. However, the program may also be recorded on any of external storage media such as an IC card, CD-ROM, MD, DVD, optical disc and FD. Namely, the program can be stored on any of the above-listed recording media externally attachable to the device. In this case, the program may be driven from the device 1 to realize the above described information processing.

The information processing device, the control method and the control processing program according to the present invention offer the following advantageous effects:

According to some aspects of the present invention, it allows a user to change the reference number-of-operations of a specific key having two different functions for returning to preceding state and returning to the initial screen. Thus, the present invention can provide the information processing device and its control method, whereby the user can more conveniently use two functions by operating the single specific key.

According to another aspects of the present invention, it allows a user to change the reference time-length-of-operation of a specific key having two different functions for returning to preceding state and returning to an initial screen. Thus, the present invention can provide the information processing device and its control method, whereby the user can more conveniently use two functions by operating the single specific key.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. An information processing device having an initial screen presentable just after turning on a power supply and as necessary thereafter and having a preceding-state returning means for executing, after transition of a screen state from one to another, a procedure for returning from a current screen state to a preceding screen state and an initial-state returning means for executing a procedure for returning from any screen state to an initial screen state, wherein it is provided with a key-operation counting means for counting the number of successive operations of a specific key, a reference storage means for storing the reference number of operations to be successively made on the specific key, said reference number being necessary for starting the initial-state returning function, a comparison means for comparing the number of operations counted by the key-operation counting means with the reference number stored in the reference storage means, and a control means for driving, according to the comparison result, the initial-state returning means when the counted number matches the reference number and the preceding-state returning means when the counted number does not match the reference number.

2. An information processing device having an initial screen presentable just after switching on power supply and as necessary thereafter and having a preceding-state returning means for executing, after transition of a screen state from one to another, a procedure for returning from a current screen state to a preceding screen state and an initial-state returning means for executing a procedure for returning from any screen state to an initial screen state, wherein it is provided with a time-length measuring means for measuring a time-length of operation made on a specific key, a reference storage means for storing the reference time-length of operation made on the specific key, said reference time-length being necessary for starting the initial-state returning function, a comparison means for comparing the key-operation time-length measured by the time-length measuring means with the reference time-length stored in the reference storage means, and a control means for driving, according to the comparison result, the initial-state returning means when the measured time-length is equal to or more than the reference time-length and the preceding-state returning means when the measured time-length is less than the reference time-length.

3. A control method of an information processing device having an initial screen presentable just after switching on power supply and as necessary thereafter, comprising mainly of a preceding-state returning step of returning from a current screen state to a preceding screen state after transition of a screen state from one to another and an initial-state returning step of returning from any screen state to an initial screen state, which further comprises, in the execution order, a counting step of counting the number of successive operations made on a specific key, a storing step of storing the reference number of operations to be necessarily made on the specific key to start the initial-state returning function, a comparing step of comparing the counted number of successive operations made on the specific key with the stored reference number, and a control step of driving either of the returning functions according to the comparison result in such a way that the initial-state returning step is executed when the counted number is equal to the reference number and a preceding-state returning step is executed when the counted number is not equal to the reference number.

4. A control method of an information processing device having an initial screen presentable just after switching on power supply and as necessary thereafter, comprising mainly of a preceding-state returning step of returning from a current screen state to a preceding screen state after transition of a screen state from one to another and an initial-state returning step of returning from any screen state to an initial screen state, which further comprises, in the execution order, a measuring step of measuring a time-length of operation made on a specific key, a storing step of storing a reference time-length of operation to be necessarily made on the specific key to start the initial-state returning step, a comparing step of comparing the measured key-operation time-length with the stored reference time-length, and a control step of driving either of the returning steps according to the comparison result in such a way that the initial-state returning step is executed when the measured time-length matches the reference value and the preceding-state returning step is executed when the measured time-length does not match the reference time-length.

5. A recording medium storing a program for use in a computer having an initial screen presentable just after switching on power supply and as necessary thereafter and having a preceding-state returning function for returning from a current screen state to a preceding screen state after transition of a screen state from one to another and an initial-state returning function for returning from any screen state to an initial screen state, which program causes the computer to execute a counting function for counting the number of successive operations made on a specific key, a storing function for storing the reference number of successive operations to be necessarily made on the specific key for starting the initial-state returning function, a comparison function for comparing the counted number of operations of the key with the stored reference number, and a control function for driving either of the returning functions according to the comparison result in such a way that the initial-state returning functions is executed when the counted number is equal to the reference number and the preceding-state returning function is executed when the counted number is not equal to the reference number.

* * * * *